US012540106B2

United States Patent
De Rezende Pinho et al.

(10) Patent No.: US 12,540,106 B2
(45) Date of Patent: Feb. 3, 2026

(54) PROCESS FOR OBTAINING AROMATICS AND AROMATIC STREAM

(71) Applicant: Petróleo Brasileiro S.A.—Petrobras, Rio de Janeiro (BR)

(72) Inventors: Andrea De Rezende Pinho, Rio de Janeiro (BR); Willian Luiz Souza Fernandez, Rio de Janeiro (BR)

(73) Assignee: Petróleo Brasileiro S.A.—Petrobras, Rio de Janeiro (BR)

( * ) Notice: Subject to any disclaimer, the term of this patent is extended or adjusted under 35 U.S.C. 154(b) by 128 days.

(21) Appl. No.: 18/042,023

(22) PCT Filed: Aug. 18, 2021

(86) PCT No.: PCT/BR2021/050349
§ 371 (c)(1),
(2) Date: Feb. 17, 2023

(87) PCT Pub. No.: WO2022/036430
PCT Pub. Date: Feb. 24, 2022

(65) Prior Publication Data
US 2023/0312434 A1    Oct. 5, 2023

(30) Foreign Application Priority Data
Aug. 20, 2020    (BR) ...................... 10 2020 016971 8

(51) Int. Cl.
*C07C 1/36* (2006.01)
*B01D 3/14* (2006.01)
(Continued)

(52) U.S. Cl.
CPC ............... *C07C 1/36* (2013.01); *B01D 3/143* (2013.01); *B01D 3/38* (2013.01); *B01J 29/084* (2013.01);
(Continued)

(58) Field of Classification Search
CPC ....... C07C 1/36; C07C 2529/40; C07C 15/02; B01D 3/143; B01D 3/38; B01J 29/084;
(Continued)

(56) References Cited

U.S. PATENT DOCUMENTS 6,153,089 A    11/2000    Das et al.
7,540,952 B2    6/2009    Pinho et al.
(Continued)

FOREIGN PATENT DOCUMENTS

BR    PI1004598 A2    6/2012
BR    PI1102958 A2    7/2013
(Continued)

OTHER PUBLICATIONS

Bielansky et al. (May 21, 2010) "Processing of pure vegetable oils in a 1-16 continuous FCC pilot plat", The 13th International Conference on Fluidization—New Paradigm in Fluidization Engineering, Art. 40, ECI Digital Archives, 9 pages.

*Primary Examiner* — Ali Z Fadhel
(74) *Attorney, Agent, or Firm* — Morrison & Foerster LLP

(57) ABSTRACT

The present invention addresses to a process for the production of aromatic compounds from streams containing linear chains with 5 to 18 carbon atoms, of fossil or renewable origin, and application in the field of catalytic cracking aiming at a regenerator operation at much lower temperature, between 480° C. and 620° C., preferably the temperature should be between 500° C. and 600° C. The coked catalyst generated by the cracking of light streams with low potential for delta coke generation can have the combustion effected at a lower temperature. The regeneration temperature must be at least 40° C. and at most 100° C. higher than the reaction temperature, keeping the catalyst circulation high to maintain the energy balance in the reaction section. The minimum regeneration temperature (Continued)

can be ensured by installing an air preheating furnace before entering the regenerator and passing through the air distributor inside the regenerator. The used catalyst must contain zeolite with pores of intermediate size. Such conditions greatly favor the production of aromatics and the octane rating of the produced naphtha.

17 Claims, 10 Drawing Sheets

(51) Int. Cl.
| | |
|---|---|
| B01D 3/38 | (2006.01) |
| B01J 29/06 | (2006.01) |
| B01J 29/08 | (2006.01) |
| B01J 29/40 | (2006.01) |
| B01J 29/80 | (2006.01) |
| B01J 29/90 | (2006.01) |
| B01J 38/02 | (2006.01) |
| B01J 38/12 | (2006.01) |
| C10G 11/05 | (2006.01) |

(52) U.S. Cl.
CPC ............... *B01J 29/40* (2013.01); *B01J 29/80* (2013.01); *B01J 29/90* (2013.01); *B01J 38/02* (2013.01); *B01J 38/12* (2013.01); *C10G 11/05* (2013.01); *B01J 2029/062* (2013.01); *C07C 2529/40* (2013.01); *C10G 2300/305* (2013.01); *C10G 2300/4006* (2013.01); *C10G 2300/4093* (2013.01); *C10G 2300/708* (2013.01)

(58) Field of Classification Search
CPC ... B01J 29/40; B01J 29/80; B01J 29/90; B01J 38/02; B01J 38/12; B01J 2029/062; C10G 11/05; C10G 2300/305; C10G 2300/4006; C10G 2300/4093; C10G 2300/708; C10G 3/49; C10G 3/62; C10G 11/182; C10G 3/57; C10G 11/18; C10G 3/00; C10L 1/04; Y02P 20/584; Y02P 30/20
See application file for complete search history.

(56) References Cited

U.S. PATENT DOCUMENTS

| 9,657,233 | B2 | 5/2017 | Bories et al. |
| 2009/0158637 | A1 | 6/2009 | Mccall et al. |
| 2013/0289324 | A1* | 10/2013 | Price ........................ C10G 3/42 |
| | | | 585/469 |
| 2016/0060542 | A1 | 3/2016 | Sugita et al. |

FOREIGN PATENT DOCUMENTS

| BR | 102012013787 A2 | 4/2014 |
| BR | 102014022366 A2 | 4/2016 |
| BR | 112013012925 A2 | 8/2016 |
| BR | 102016003995 A2 | 4/2019 |
| JP | 2011032333 A | 2/2011 |
| WO | 2010023456 A1 | 3/2010 |
| WO | 2012088546 A1 | 6/2012 |

* cited by examiner

Figure 1
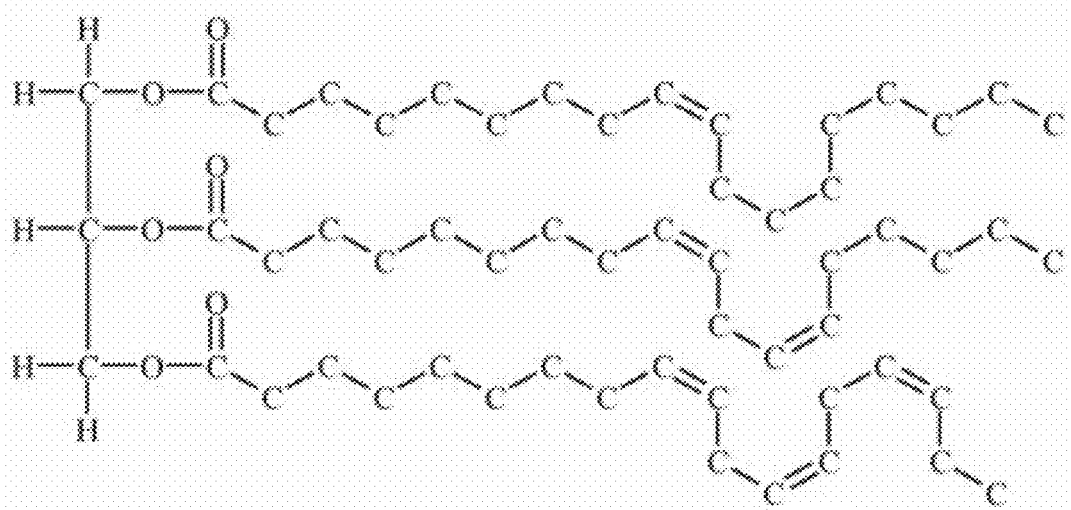
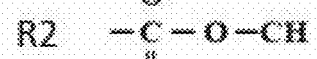
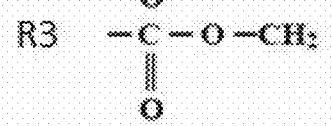

Figure 5
(a)
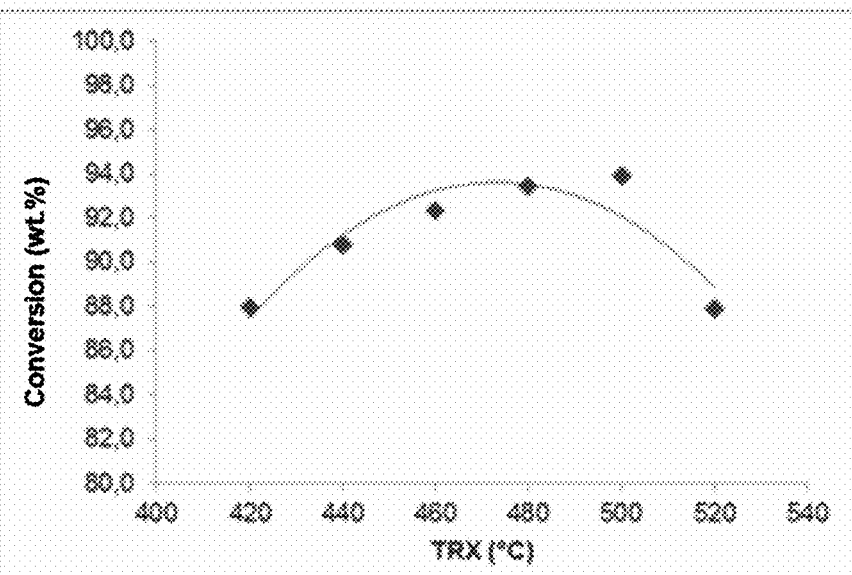
(b)
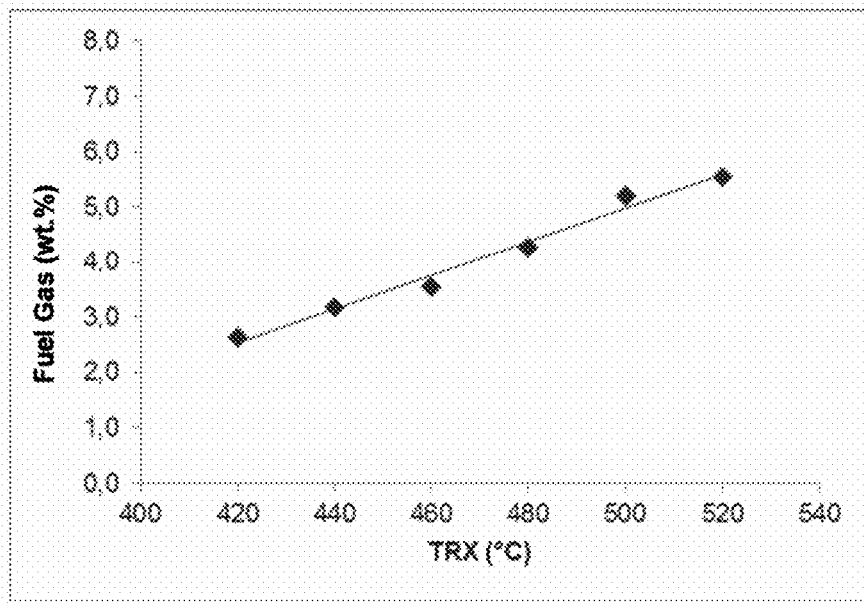

Figure 6
(a)
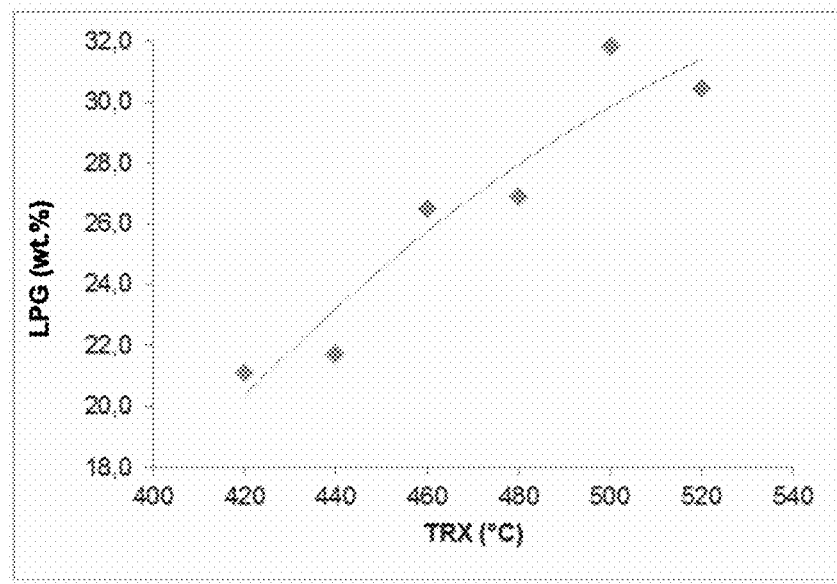
(b)
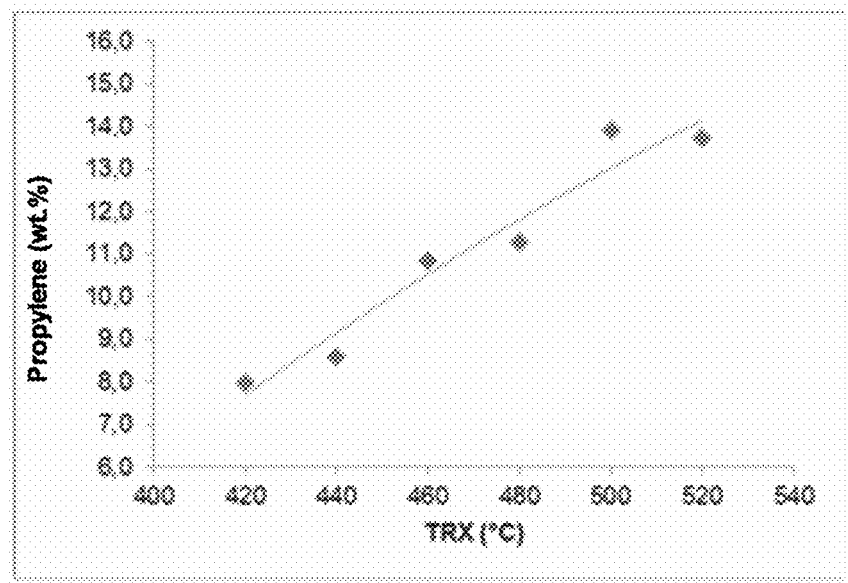

Figure 8
(a)
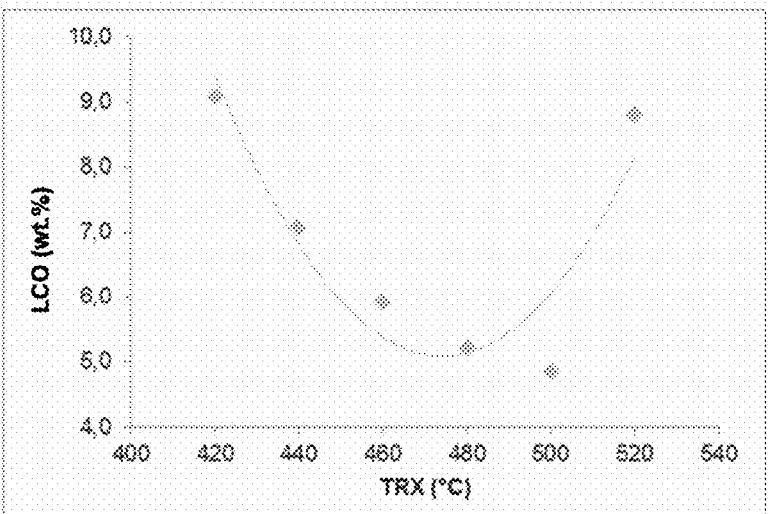
(b)
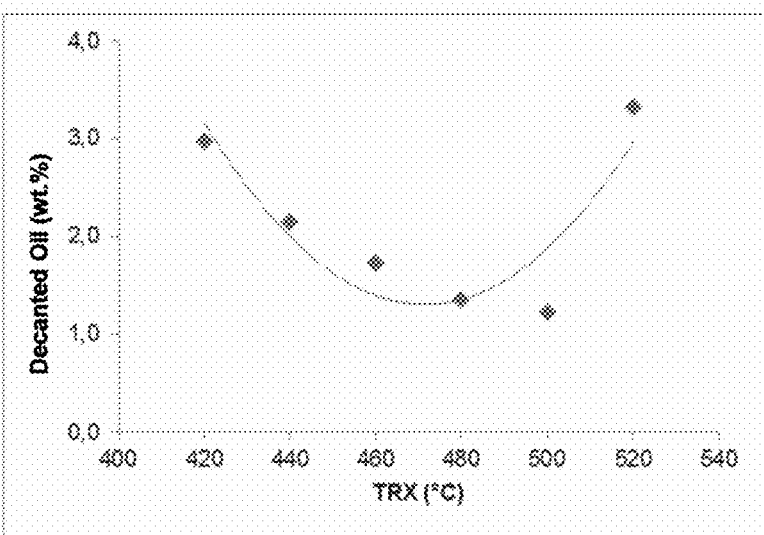

Figure 9
(a)
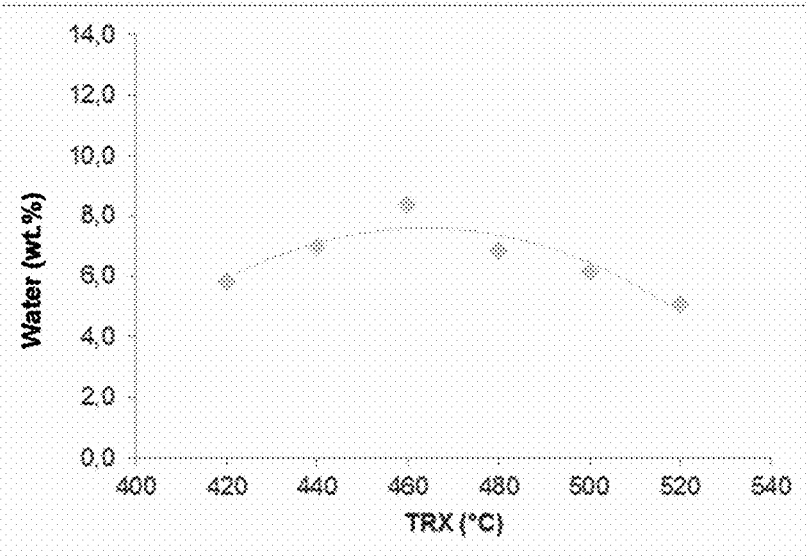
(b)
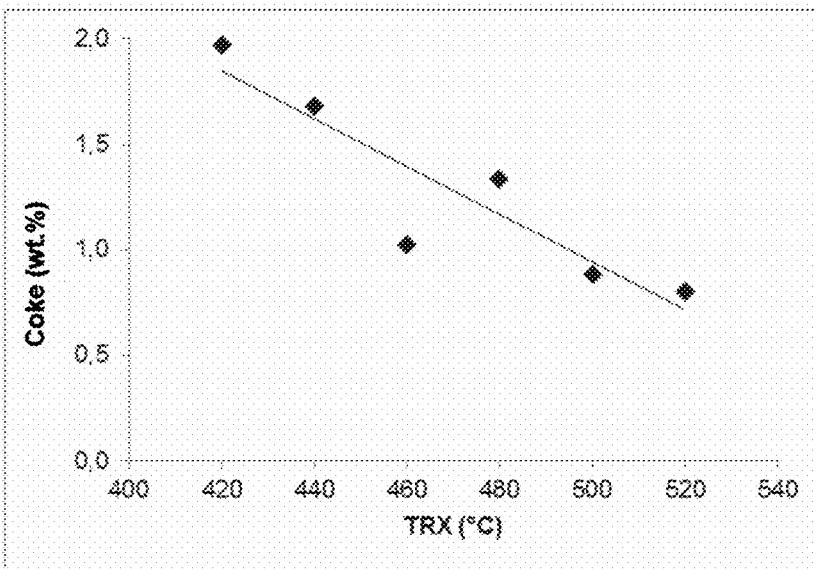

Figure 10
(a)
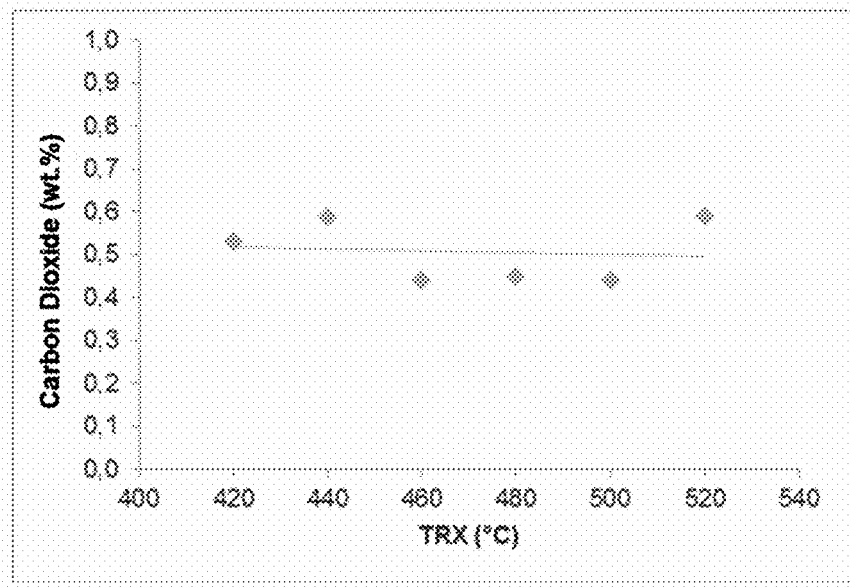
(b)
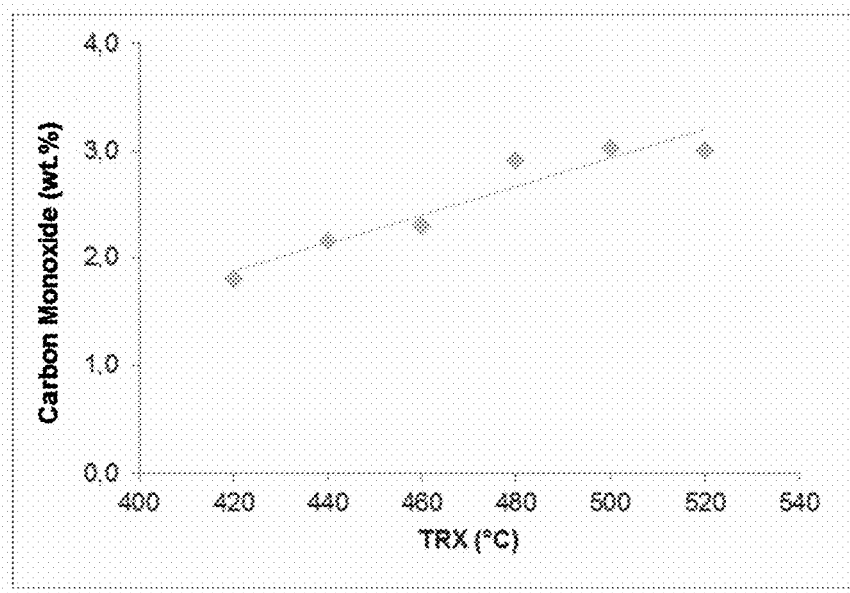

Figure 11
(a)
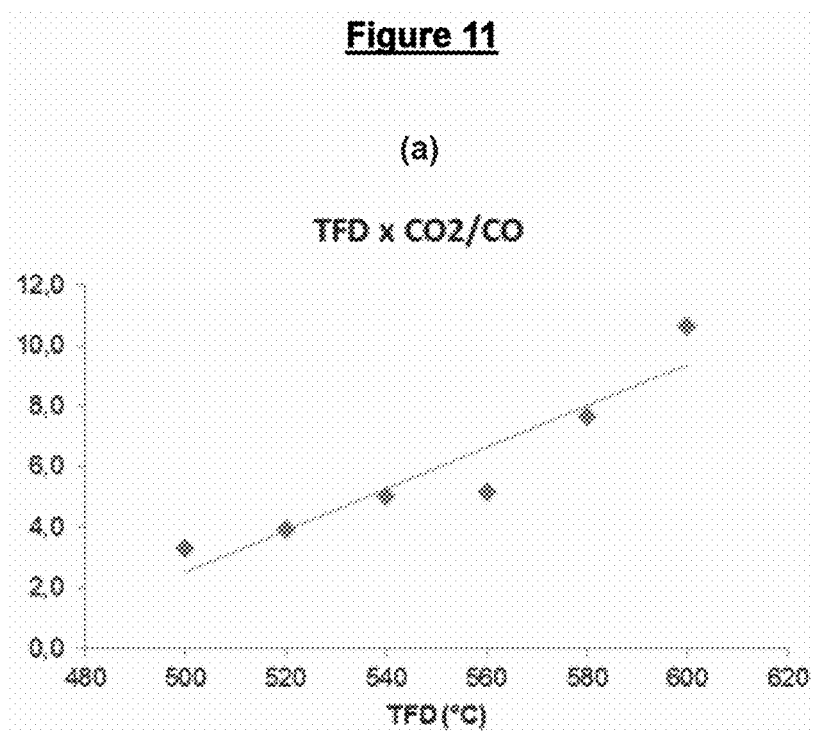
(b)
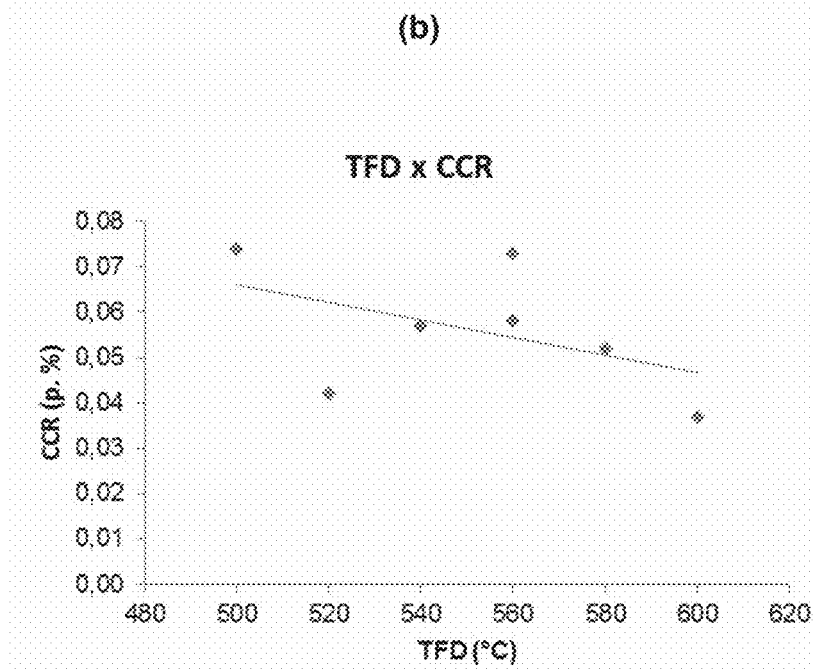

PROCESS FOR OBTAINING AROMATICS AND AROMATIC STREAM

CROSS-REFERENCE TO RELATED APPLICATIONS

This application is a national stage application, filed under 35 U.S.C. § 371, of PCT International Patent Application No. PCT/BR2021/050349, filed Aug. 18, 2021, and entitled "PROCESS FOR OBTAINING AROMATICS AND AROMATIC STREAM," and claims benefit of and priority to BR Application No. 10 2020 016971 8, filed Aug. 20, 2020, the disclosures of all of which are incorporated herein by reference in their entireties.

FIELD OF THE INVENTION

The present invention addresses to a process for the production of compounds with a single aromatic ring from streams containing linear chains with 5 to 18 carbon atoms, of fossil or renewable origin, and with application in the field of catalytic cracking through the operation of the regenerator at a much lower temperature, between 480° C. and 620° C., preferably the temperature should be between 500° C. and 600° C., and in which the catalyst regeneration temperature is at least 40° C. and at most 100° C. higher than the temperature of reaction. The used catalyst must contain a molecular sieve with pores of intermediate size.

DESCRIPTION OF THE STATE OF THE ART

In the catalytic cracking process in a fluidized bed, the hydrocarbon cracking reactions occur by contacting a load with a catalyst in a dynamic flow regime, in a tubular reactor in ascending flow, also known as a riser, converting the load into lighter and more economically valuable hydrocarbon streams. Thus, hydrocarbon streams from oil refining with boiling points between 350° C. and 550° C. are converted into lighter hydrocarbons, predominantly gasoline constituents with a distillation range between 35° C. and 220° C. Alternatively, liquid streams of renewable origin can also be used. The reaction temperatures (TRX) in the reactor are around 540° C. at the reactor outlet.

The cracking reactions are endothermic, and the increased severity of the reaction makes it difficult to meet this energy demand. In the conventional catalytic cracking, this thermal demand is met by burning the coke deposited on the catalyst in the reaction section. The catalyst is burned with air in a regeneration section at temperatures around 700° C. In this way, its catalytic activity is restored and the heated catalyst can be returned to the reaction section and provide the necessary heat for endothermic reactions.

The problem of meeting the thermal demand is aggravated if the streams used as a load are formed by light hydrocarbons, such as light paraffinic streams with 5 to 18 carbon atoms, produced from the distillation of oil, or smaller chains from the associated gas production, which tend to deposit smaller amounts of coke on the catalyst compared to conventional, heavier loads, such as vacuum gas oils or atmospheric residues. These light streams cannot be used directly as fuel and have a low commercial value. However, they can be converted into higher added-value products such as BTX (benzene, toluene and xylenes) aromatics.

Like paraffinic fossil streams, some liquid streams of renewable origin, such as soybean oil, castor oil and beef tallow, have linear chains with up to 18 carbons in their structure, as shown in FIG. 1, in which it is shown a typical triglyceride structure. Radicals R1, R2 and R3 (linear carbon chains) generally have from 9 to 18 carbon atoms. These streams usually contain at least one unsaturation, but like the fossil streams obtained from the associated gas production, they do not have aromatic rings in their structure and have a low potential for coke formation in catalytic cracking.

Useful catalysts for catalytic cracking contain USY and REY-type Y zeolites. In commercial catalytic cracking reactors, ZSM-5 (MFI) zeolites, which have pores of intermediate size, are further used to produce olefins, aromatics and increase the octane rating of gasoline. The expression "intermediate pore size zeolite" is applied to any zeolite whose pore size is intermediate between small pore zeolites, such as A type zeolites, and large pore zeolites, such as X and Y zeolites. Intermediate zeolites are crystalline structures whose rings have 10 or 12 oxygen atoms. These zeolites must have a silica-to-alumina ratio between 10 and 300. Examples of intermediate pore zeolites are, in addition to ZSM-5, ZSM-8, ZSM-11 (also known as MEL), ZSM-12, ZSM-21, ZSM-23, ZSM-35, ZSM-38, IMF (a.k.a. IM-5), TUN (a.k.a. TNU-9), and EUO zeolites. Among these, only ZSM-5 is currently used commercially in catalytic cracking, as many of them are unstable and lose their activity at the high temperatures at which these converters operate today.

The processing of linear streams with 5 to 18 carbon atoms in catalytic cracking leads to non-compliance with the thermal demand in catalytic cracking for three main reasons: 1) the load itself is not a good precursor for coke formation, presenting low carbon residue Ramsbottom; 2) light hydrocarbons are more refractory to cracking and the state of the art indicates the application of higher reaction temperatures; 3) ZSM-5 zeolites, as well as other zeolites with smaller cavities than Y zeolite, do not produce large deposition of coke on the catalyst.

However, there is little literature related to solving the problem of energy deficit in catalytic cracking. Usually, this deficiency is solved by burning torch oil, also known as heating oil, in the regenerator. Under this approach, the regenerator becomes a combustor, where the oil burning generates enough heat to heat the catalyst. The regenerator bed must be heated by burning torch oil to temperatures around 700° C. Dense phase temperatures (TFD) lower than 680° C. make it difficult to burn the heating oil in the regeneration bed and cause uncontrolled catalyst circulation towards the cracking reactor. The generated heat is transported to the reaction section, through the catalyst itself. However, the burning of oil in the regeneration bed favors the occurrence of several regenerator operating problems. For example, the choice of heating oil to be used must be careful, as heating oils with a very low distillation point can cause afterburning, that is, combustion outside the bed. The temperature differential between the bed and the combustion gases can reach 300° C., generating high temperatures in the cyclones and other equipment inside and outside the regenerator. Another possible problem is the wear of the dispersers responsible for introducing the heating oil into the regenerator. Early deactivation of the catalyst may further occur, due to the generation of high temperature points in the combustion bed. In addition, burning oil generates energy waste, which significantly increases the carbon footprint in catalytic cracking units.

In addition to the energy deficit, the catalytic cracking of lipid streams (triglycerides) leads to another problem when one wishes to maximize the production of aromatics: a large production of gases in the LPG (liquefied petroleum gas) range is generated as reaction by-product, as the characteristics of the molecules that make up plant oils and animal fats, with long linear chains, without aromatic rings, and some double bonds in the side chains, are suitable for the generation of these gases.

In this way, small refineries would benefit enormously from a process that favored exclusively the production of aromatics, without increasing the yields of propylene or LPG. For these refineries, an innovative approach is required, which minimizes the formation of gases during cracking.

The reduction of gas production can be achieved by reducing the reaction temperature (TRX). This approach brings some difficulties, since the catalytic cracking process (FCC) is thermally balanced and the decrease in the reaction temperature decreases the energy demand of the reaction section, which leads to a lower yield of catalytic coke and a lower temperature in the catalyst regeneration section, in which combustion of the coke that was deposited on the catalyst during the reaction takes place. This decrease in the dense phase temperature (TFD), in turn, makes the coke combustion itself more difficult. Modern regenerators operate in the dense phase of the regeneration bed, in which most of the combustion of the coke deposited on the catalyst takes place, with minimum temperatures around 680° C. and catalyst residence time around 4 minutes in the regenerator, which ensures the burning of the coke. Normally, the maximum temperature in the dense design phase is 760° C., while operationally this temperature is maintained at a maximum of 730° C.

However, the regenerators designed in the 1950s operated at much lower regeneration temperatures, around 620° C., as the catalysts used in UFCCs after World War II were silica-aluminas more susceptible to hydrothermal deactivation, suffering strong deactivation at higher combustion temperatures. In this way, the regenerators were designed to operate at milder temperatures, compensating for the less severe temperature by increasing the residence time, around 10 minutes. With the advent of Y zeolite, the regenerator design criteria were changed, which began to be designed with higher regeneration temperatures (680° C. to 720° C.) and shorter residence times (4 minutes).

For simplicity, the dense phase temperature (TFD) will be considered as the regeneration temperature. It is known that for the same difference between regeneration and reaction temperature (TFD–TRX), approximately the same catalyst-oil ratio is reached (Equation 1). That is, catalyst circulation can be maximized by decreasing the difference between the regeneration temperature and the reaction temperature.

Catalyst/Oil×(TFD−TRX)=constant  (Equation 1)

Light streams with boiling points in the range of 70° C. to 300° C., fossil or renewable, can be converted in catalytic cracking into aromatic compounds through the use of ZSM-5 and high reaction temperatures. In this environment, the temperature of the regenerator is maintained at approximately 700° C. The regenerated catalyst returns to the riser reactor providing heat to the reaction medium. However, the amount of heat required for cracking reactions in the riser environment limits the reaction temperature in this environment, limiting operational severity. Additionally, the thermal shock promoted by the catalyst at the base of the riser reactor favors the formation of light olefins, such as propane, propylene, butanes and other compounds in the range of LPG and fuel gas as a by-product. This thermal shock is favored by the very high temperature at which the catalyst is found in the regenerator, around 700° C.

However, when these light olefins are not desirable and it is desired to maximize the aromatic base liquid fractions and generation of streams from the naphtha range with high octane rating in a circulating fluidized bed, a solution to this technical problem becomes necessary.

Document BR112013012925-5 discloses a method of producing BTX aromatic compounds of high concentration and high added value, using various fractions of oil, including LCO (light oil produced from recycle) containing a large amount of compounds of high aromaticity as raw material alternative to naphtha (conventional raw material) and obtained from catalytic cracking. The method employs a hydrogenation step, a catalytic cracking step, a separation step and a transalkylation step.

Document U.S. Pat. No. 6,153,089 discloses a process for converting undesirable olefinic hydrocarbon flows into hydrogen and petrochemical raw materials, such as light olefins in the C2-C4 range and aromatics, especially toluene and xylenes, which comprises simultaneous cracking and reforming of olefin-rich hydrocarbons using a catalyst composed of dehydrogenating metallic components, selective zeolite-form components and large-pore acid components in different ratios in a circulating fluidized-bed reactor-regenerator system with a reactor temperature in the range of 450° C. to 750° C. and WHSV from 0.1 to 60 hour$^{-1}$. The special speed decrease is achieved by installing a fluidized bed reactor at the end of the catalytic cracking riser reactor.

One way to mitigate the energy deficit created by the use of streams with low coke formation potential includes the use in the catalytic cracking of catalysts containing zeolites modified with dehydrogenating metals such as nickel, which promote the formation of coke, as taught by the document WO2010023456. Despite attenuating the energy deficit in cracking, the proposed solution was not able to eliminate the same.

For years, several studies have been developed for the generation of bioproducts from the catalytic cracking of renewable streams from different origins with tests on various scales, pilot, demonstration and industrially, to generate a wide range of products also from renewable origins.

Some renewable streams, even if liquid, have chemical characteristics very different from lipid streams (soybean oil, castor oil or beef tallow), showing a high potential for coke formation. Among them, lignocellulosic streams can be mentioned, such as pyrolysis oil, or bio-oil, from the process of rapid pyrolysis of biomass. Bio-oil consists of a mixture of several families of oxygenated compounds such as aldehydes, ketones, phenolic compounds. It has a high aromatic content and a high potential for coking in catalytic cracking and should not be confused with lipid streams. Document BR102012013787-9, for example, discloses a process for the generation of fuels, more specifically for the production of high-octane-rating gasoline, from plant biomass of lignocellulosic origin, without linear carbon chains. Such a process involves a first step, where there is depolymerization of lignin through the co-processing of the plant biomass with a stream of hydrocarbons, introduced separately into two reaction zones of a fluid catalytic cracking reactor under low pressure, and a second step of hydrotreating the stream of hydrocarbons in the gasoline fraction from the catalytic cracking reactor. Bio-oil, contrary to the lipid streams of the present invention, does not generate energy deficit in catalytic cracking, as it is of lignocellulosic origin, presenting a high potential for coke formation.

Document BR102016003995-9 discloses a process for obtaining biofuels, in particular high-octane-rating gasoline, through the co-processing of a load comprising pyrolysis oil (bio-oil), a gaseous stream of light saturated hydrocarbons, rich in hydrogen, and a fossil main load, in the FCC process. It uses two reaction sections in its process: reaction temperature in the range of 500° C. to 800° C. in the first reaction section and in the range of 500° C. to 620° C. in the second reaction section. The bio-oil, a plant stream described in the document, does not generate energy deficit in catalytic cracking, as it is of lignocellulosic origin, and, unlike the lipid streams of the present invention, it has a high potential for coke formation.

Documents BRPI1004598 and BRPI1102958 teach how to maximize the generation of aromatic BTX (benzene, toluene, xylenes) from plant oils for the unprecedented production of polymers of renewable origin such as PET and polystyrene, using catalysts based on ZSM-5. The achieved values of concentration of aromatics in this liquid product were much higher than those obtained with catalysts with faujasitic zeolite achieved by BR 102014022366-5. However, the production of gases is still quite high, and the yield of products in the naphtha range, in which the aromatic products of interest are found, never exceeds 35% by weight in relation to the feed. The LPG yield still reached 30.0% by weight, too high for catalytic cracking units that do not have propylene separators and, therefore, unable to market the same. The energy deficit of catalytic cracking is resolved by co-processing a lignocellulosic stream produced by the rapid pyrolysis of biomass (with high potential for coke formation) with lipid streams (with low potential for coke formation) to restore thermal equilibrium in the converter.

Document U.S. Pat. No. 7,540,952 teaches how to co-process plant oils with heavy vacuum gas oil in catalytic cracking to maximize middle distillates. As an example, the use of castor oil (castor oil or *Ricinus* oil) is mentioned as feed for an FCC pilot unit, using reaction temperatures between 300° C. and 400° C., much lower, therefore, than those used in a conventional FCC. Under these conditions, products in the range of diesel oil are maximized, but with little production of low-octane-rating gasoline. The patent does not teach, however, how to deal with the increasing energy deficit caused by the use of larger amounts of plant oil as feed to the FCC converter in substitution of vacuum gas oil, which limits the use of this renewable fraction.

Document BR 102014022366-5 also employs renewable lipid streams for the production of cracked naphtha in catalytic cracking reactors, using faujasitic catalysts. The produced naphtha has characteristics similar to those of cracked naphtha of fossil origin, with a high content of bio-aromatics that have the advantage of having a low content of oxygenates, providing to these products a high calorific value when compared to alternative products such as ethers (ETBE and MTBE) and alcohols (ethanol and butanol). However, cracked naphtha obtained from soybean oil has low oxidation stability, requiring chemical treatments in order to ensure the necessary stability for commercial gasoline. Nor does the document propose a solution for the energy deficit in catalytic cracking caused by the use of plant oil.

WO2012/088546 discloses a method for the production of aromatics from renewable sources using catalysts with gallium. More specifically, it discloses preferred embodiments related to the conversion of oils containing fat or other lipids derived from biomass, such as oil from naturally occurring non-vascular photosynthetic organisms and/or from genetically modified non-vascular photosynthetic organisms; canola oil and other oils derived from plants such as corn, soybean, sunflower and sorghum; and/or oils from other plant materials, seeds, fungi, bacteria and other living organisms. Biomass conversion is not done in catalytic cracking reactors.

Document US2009/0158637 discloses a process for producing aviation fuel from renewable raw materials, such as plant oils and animal fats and oils. The process involves treating a renewable raw material by hydrogenation and deoxygenation to provide n-paraffins of from about 8 to about 24 carbon atoms. At least some of the n-paraffins are isomerized to improve cold flow properties. At least a portion of the waxes is selectively broken down to provide waxes that meet specifications for different aviation fuels, such as JP-8. The process does not have selective catalytic cracking conditions and is not designed to maximize the production of aromatics.

No document of the state of the art discloses a process for producing aromatics in a fluidized catalytic bed with cold regeneration showing particular properties such as those of the present invention.

The present invention proposes the operation of the regenerator at a much lower temperature, between 480° C. and 620° C., during operations with light loads, in the gasoline and diesel range, or with loads with low potential for coke production or low residue of carbon.

Preferably, this temperature should be between 500° C. and 600° C.; so, a lower temperature in the regenerator will promote less thermal shock of the catalyst on the load when returning to the riser reactor, but will keep a high catalyst circulation to maintain the energy balance in the reaction section. The coked catalyst generated by the cracking of light streams with low potential for delta coke generation can have the combustion effected at a lower temperature. The minimum combustion temperature can be ensured by installing an air preheating furnace before it enters the regenerator and passes through the air distributor inside the regenerator. The regeneration temperature will be kept at least 40° C. and at most 100° C. higher than the reaction temperature.

Such conditions greatly favor the production of aromatics and the octane rating of the naphtha produced.

Another advantage of the described solution is the minimization of catalyst deactivation, since the combustion of the coke deposited on the catalyst occurs under significantly milder conditions, allowing the maintenance of catalytic activity.

The present invention becomes important for the production of aromatics from streams with linear carbon chains, of fossil or renewable origin, with or without unsaturation, with 5 to 18 carbon atoms. These aromatics can be used as basic petrochemical inputs.

It further allows the conversion of streams of renewable origin such as beef tallow, used frying oil, plant oils and fatty acids in general into aromatics. These same aromatics can be used as inputs for addition to aviation kerosene (QAV). It should be noted that there are currently no other production routes for the production of renewable aromatics for QAV.

As described below, the present invention advantageously presents gains in selectivity for the production of aromatics while minimizing the problems caused by energy deficiency presented in the process.

BRIEF DESCRIPTION OF THE INVENTION

The present invention addresses to a process for the production of aromatics in which the operation in the regenerator takes place at a much lower dense phase temperature, between 480° C. and 620° C., preferably between 500° C. and 600° C., during operations with streams containing linear chains with 5 to 18 carbon atoms, of fossil or renewable origin, which have low potential for coke production and low carbon residue. A lower temperature in the regenerator will promote less thermal shock in the reaction section, but will keep the catalyst circulation high to maintain the energy balance in the reaction section if the regeneration temperature (dense phase temperature) is at least 40° C. and at most 100° C. higher than the reaction temperature. The coked catalyst generated by the cracking of light streams with low potential for delta coke generation can have the combustion effected at a lower temperature. The minimum combustion temperature can be ensured by installing an air preheating furnace before entering the regenerator and passing through the air distributor inside the regenerator. Such conditions greatly favor the production of aromatics and the octane rating of the produced naphtha.

The invention can be applied to any existing catalytic cracking unit provided that small modifications are implemented that allow the maintenance of the energy balance. It is suggested the permanent operation of a combustion air heating furnace for the regenerator to maintain the energy balance when necessary. The furnace must be designed for heating air to a temperature of 550° C.

The used catalyst must contain molecular sieve with pores of intermediate size.

BRIEF DESCRIPTION OF THE DRAWINGS

The present invention will be described in more detail below, with reference to the attached figures which, in a schematic way and not limiting the inventive scope, represent examples of the embodiment of the same. In the drawings, there are:

FIG. 1 illustrating the structure of a typical triglyceride;

FIG. 5 illustrating (a) conversion and (b) fuel gas as a function of reaction temperature (TRX);

FIG. 6 illustrating (a) LPG and (b) propylene as a function of reaction temperature (TRX);

FIG. 8 illustrating (a) LCO and (b) decanted oil as a function of reaction temperature (TRX);

FIG. 9 illustrating (a) water and (b) coke as a function of reaction temperature (TRX);

FIG. 10 illustrating (a) carbon dioxide and (b) carbon monoxide (as reactor products) as a function of reaction temperature (TRX);

FIG. 11 illustrating (a) $CO_2/CO$ ratio and (b) carbon in the regenerated catalyst (RCC) as a function of dense phase temperature (TFD).

DETAILED DESCRIPTION OF THE INVENTION

The present invention discloses a process for the production of aromatics from streams containing linear chains with 5 to 18 carbon atoms, of fossil or renewable origin, with application in the field of catalytic cracking through operating the regenerator at a temperature much lower temperature, between 480° C. and 620° C., preferably the temperature should be between 500° C. and 600° C., and in which the catalyst regeneration temperature is at least 40° C. and at most 100° C. higher than the reaction temperature.

A lower temperature in the regenerator promotes a lower thermal shock, but is still able to keep a high catalyst circulation to maintain the energy balance in the reaction section, provided that the reaction temperature remains at adequate values, according to Equation 1.

The coked catalyst generated by the cracking of light streams with low potential for delta coke generation can have the combustion effected at a lower temperature.

The minimum combustion temperature can be ensured by installing an air preheating furnace before entering the regenerator and passing through the air distributor inside the regenerator. The furnace must be designed for heating the air to a temperature of 550° C.

Figure 2:
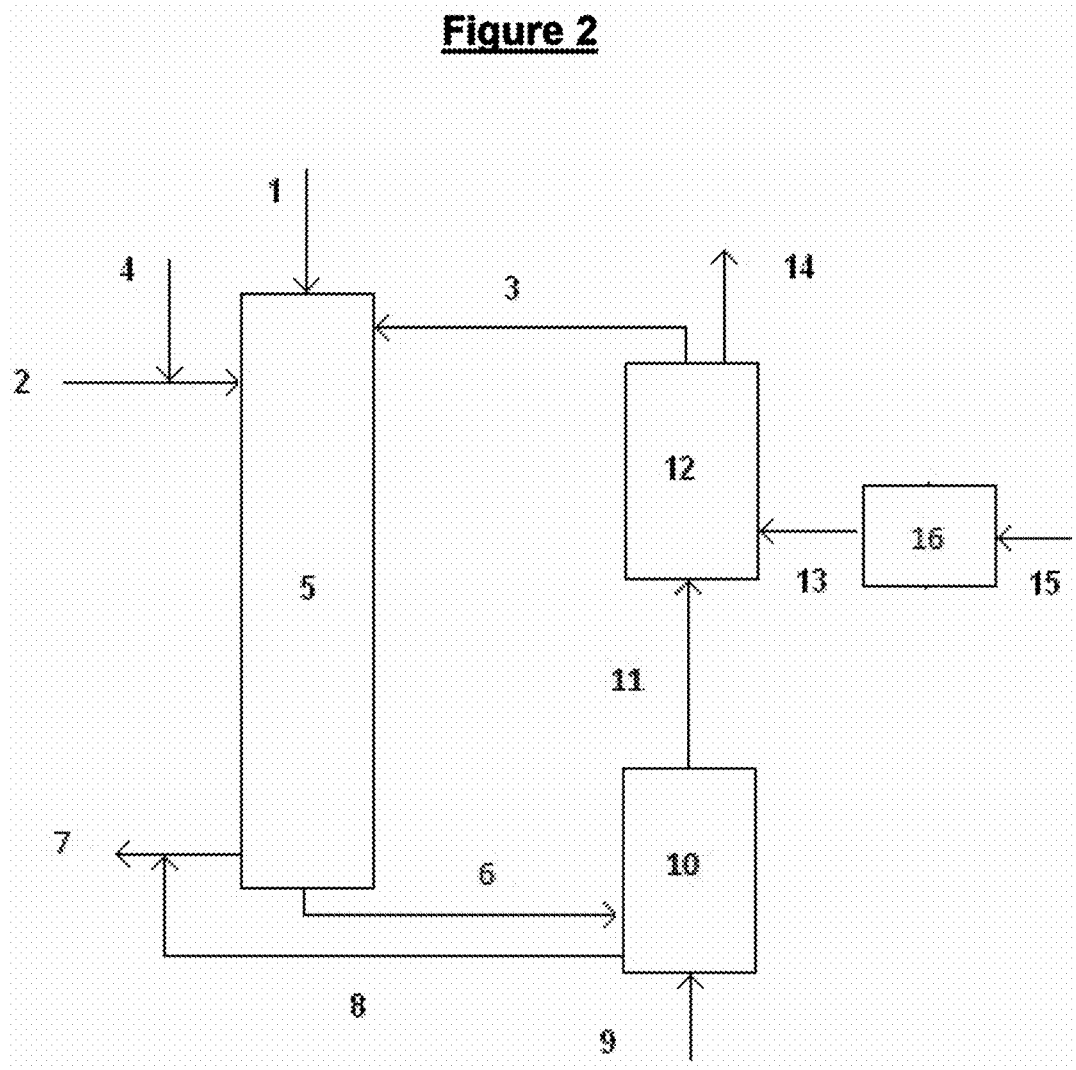
FIG. 2 illustrating in a simplified way the flow diagram of the process of the present invention.
Figure 3:
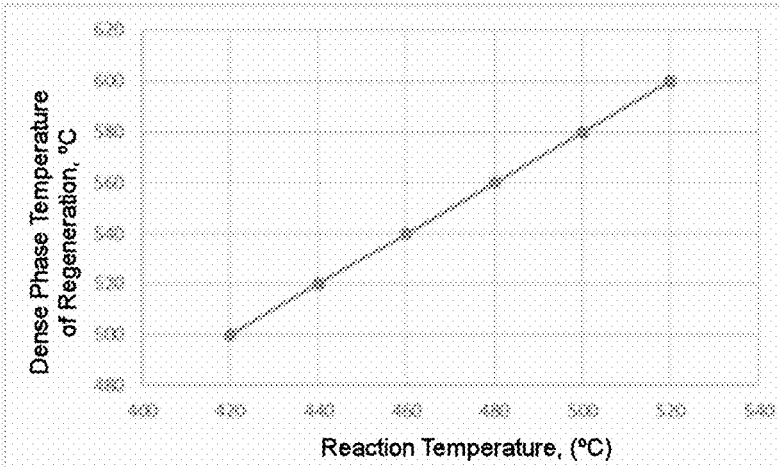
FIG. 3 illustrating a graph with the operating conditions, reaction temperature (TRX) and dense phase temperature (TFD), used in Examples 2, 3 and 4. The catalyst-oil ratio remains constant for the same delta temperature of the dense phase of the regenerator and reaction temperature. The delta TFD-TRX was maintained at 80° C., keeping the catalyst circulation constant.

The process of the invention for obtaining aromatics and high-octane-rating gasoline from streams with linear chains of 5 to 18 carbon atoms comprises the following steps, described with the aid of FIG. 2, which presents, in a simplified way, the process flow diagram:

a) introducing the preheated feed stream (2) into a fluid catalytic cracking reactor (5) so that it comes into contact with an intermediate pore zeolite catalyst (3), coming from a regenerator (12), from the which a mixture between gaseous cracking products and coke-deactivated catalyst (6) is obtained;

b) separating from said mixture the cracking products and the coke-deactivated catalyst (6);

c) subjecting the coke-deactivated catalyst (6), separated in the previous step, to a rectification step (10) with water vapor (9) for removing light hydrocarbons (8);

d) subjecting the rectified catalyst (11) in the previous step to a regeneration step (12) and combusting the coke deposited on the catalyst particles, in which the combustion temperature does not exceed 600° C., in order to obtain catalyst particles with activity higher than that of the spent catalyst;

e) allocating the regenerated catalyst (3) and with restored activity back to the reactor (5) in order to continue the catalytic cracking process;

f) allocating the hydrocarbon streams (7) obtained in the catalytic cracking reactor to a fractionation section in order to separate the produced hydrocarbons according to their boiling points;

wherein the catalyst regeneration temperature is at least 40° C. and at most 100° C. higher than the reaction temperature.

Next, the invention is described in detail with the help of FIG. 2, which presents, in a simplified way, the process flow diagram in a catalytic cracking unit for processing streams containing linear chains with 5 to 18 carbon atoms carbon, which mainly aims at maximizing the production of aromatics with a benzene ring.

A preheated feed stream (2) is introduced to the fluid catalytic cracking reactor (5) with the aid of a dispersing fluid such as water vapor (4), coming into contact with an intermediate pore zeolite catalyst (3), coming from the regenerator (12). The catalyst is lifted towards the reaction zone by means of lift vapor (1). Feed and catalyst come into contact under conditions of catalytic cracking, namely: temperature from 40° C. to 100° C. lower than that of the dense phase of the regeneration section (12); contact time in the range between 1.0 and 3.0 seconds; catalyst-oil ratio between 5 and 30.

At the outlet of the reactor, at the end of the reactions, the coke-deactivated catalyst (6) is separated from the products of the cracking reactions.

The coke-deactivated catalyst (6) goes to a rectification step (10) where it receives a gaseous stream (9), inert, preferably water vapor, to remove light hydrocarbons (8) that are directed to mix with the already separated products and compose hydrocarbon streams (7) obtained in the process.

After the rectification (10), a deactivated catalyst (11) goes to a regeneration step (12) by combustion of coke in the presence of air (13), heated in a preheating furnace (16) and fed by air (15) coming from a blower (not shown in FIG. 2), resulting in combustion gases (14) whose main components are carbon monoxide, carbon dioxide, nitrogen and unreacted oxygen.

The regenerated catalyst returns to the reactor (5) at a temperature high enough to provide heat for the endothermic reactions of the process, thus completing a cycle of the process of the present invention.

The hydrocarbon streams (7) obtained in the process comprise: fuel gas (hydrogen, C1 and C2) which includes ethylene, lights (C3 and C4); highly aromatic naphtha (C5+, 220° C.); and other hydrocarbons (>220° C.).

The preheated feed stream (2) of the present invention can be a biomass of plant or animal origin composed of mono, di, or triglycerides, wherein the oil of renewable origin can be castor oil, soybean oil, cottonseed oil, beef tallow or even any other triglyceride or reaction product of its transesterification with methanol or ethanol.

The preheated feed stream (2) of the present invention can further be a stream of fossil hydrocarbons to be selected among oil refining streams that have boiling points in the range between 40° C. and 300° C.

The intermediate pore zeolite catalyst (3) contains a crystalline structure selected from: MFI, MEL, ZSM-8, ZSM-12, ZSM-21, ZSM-23, ZSM-35, ZSM-38, IMF and TUN and any of these combinations.

The operating conditions in the reactor (5) occur at pressures in the range of 200 to 400 kPa, catalyst-oil ratio in the range of 5 to 30 and contact time in the range between 1.0 and 3.0 seconds. The fluid catalytic cracking reactor is of the riser type.

The gasoline produced can be subsequently hydrogenated at temperatures between 350° C. and 390° C., using a sulfide system as a catalyst based on $CoMo/Al_2O_3$, containing from 2.5% to 6% by mass of cobalt and about 7 to 10% by mass of molybdenum.

The air (15) used in the regenerator (12) for the combustion of the coke deposited on the catalyst must be preheated in the furnace (16) at temperatures of up to 550° C. to generate the air (13) to be fed into the regenerator, preferably up to 500° C.

The aromatic streams obtained from the described process have a typical naphtha distillation range, between 30° C. and 220° C., are 100% renewable, in which they contain between 70% m/m and 90% m/m of aromatics with a benzene ring mixed with paraffinic and olefinic compounds, and have a minimum RON octane rating of 100 and MON octane rating of 85.

EXAMPLES

For this study, the following tests were carried out, which represent examples of the present invention, where the results of processing streams containing linear chains with 5 to 18 carbon atoms for the production of aromatics are shown.

The process as described significantly increases the production of aromatics in catalytic cracking as can be demonstrated by the examples shown here, especially the production of xylenes, especially p-xylene. There are also increases in the production of toluene and benzene.

Example 1: U-144 from Six 1.1—Load

Biodiesel of plant origin, containing approximately 18 carbon atoms, was used as the load, where its properties are shown in Table I.

TABLE I

Biodiesel characterization

| Analysis | Method | Result |
|---|---|---|
| Flash point (° C.) | ASTM D93/ASTM D93 | 150.0/174.5 |
| Density 20/4° C. | ASTM D4052/ASTM | 0.8800/0.8772 |
| Appearance/color | Visual | LII/brown |
| Acidity number (mg) | EN ISO 14104 | 0.35 |
| Cold plugging point | NBR 14747 | 1 |
| Oxidation stability | EN 14112 | 9.0 |
| KF water content (mg/kg) | EN ISO 12937 | 340 |
| Viscosity @40° C. (cSt) | ASTM D445 | 4.2559 |
| Viscosity @60° C. (cSt) | ASTM D445 | 2.9466 |
| Ash content (wt. %) | ASTM D482 | 0.001 |
| Asphaltenes with n-heptane | ASTM D6560 | <0.50 |
| Basic nitrogen (mg/kg) | UOP 269-10 | 1.9 |
| Higher calorific value | ASTM D240 | 9557 |
| Micro Carbon Residue | ASTM D4530 | <0.01 |
| Aniline point (° C.) | NBR 11343 | <0 |
| Sulfur (mg/kg) | ASTM D5453 | <5 |
| Total nitrogen (mg/kg) | ASTM D5453 | 17.30 |
| Fe (mg/kg) | ASTM D5708 | 0.19 |
| Ni/V (mg/kg) | ASTM D5708 | <0.01/<0.01 |
| Na/Zn (mg/kg) | ASTM D5708 | 0.08/0.01 |

The radicals R1, R2 and R3 of the plant oil in FIG. 1 that generate biodiesel are linear chains and often have a double bond and therefore do not contain aromatic rings.

1.2—Catalyst

In this example 1, a catalytic system consisting of a mixture of a catalyst containing Y zeolite (commercial catalyst C1) and catalyst based on ZSM-5 zeolite (catalyst C2) was used. The catalyst containing ZSM-5 was then mixed with the commercial catalyst containing Y zeolite in the ratio 80%/20%, generating catalyst C4.

Catalyst C2 containing fresh ZSM-5 did not undergo prior deactivation, as catalysts based on ZSM-5 are very resistant to deactivation. The commercial catalyst with Y zeolite (catalyst C1) was collected directly from the refinery.

Catalyst C3 is also a commercial catalyst containing only Y zeolite. The characterization of the catalysts used is shown in Table II.

TABLE II

Characterization of the catalysts

|  | C1 | C2 | C3 |
|---|---|---|---|
| $Al_2O_3$ (wt. %) | 36.2 | 23.0 | 43.2 |
| Na (wt. %) | 0.3 | 0.3 | 0.23 |
| $SiO_2$ (wt. %) | 58.4 | 63.1 | — |
| $RE_2O_3$ (wt. %) | 0.87 | 0.15 | 2.59 |
| $P_2O_5$ (wt. %) | 1.5 | 11.2 | 0.7 |
| Ni (ppm) | 3000 | — | 1053 |
| V (ppm) | 600 | — | 544 |
| Surface area ($m^2/g$) | 145.4 | 76.0 | 159.2 |
| Mesopores area ($m^2/g$) | 24 | — | — |
| Micropore volume ($cm^3/g$) | 0.057 | 0.027 | — |
| LOI (wt. %) | — | 10.5 | — |
| TMP (micrometers) | 83 | 79 | — |
| <40 micrometers (%) | 0 | 13 | — |

1.3—Test Units

The U-144, located in São Mateus do Sul-PR, is a demonstration-scale FCC circulating unit, which normally operates with load flow rates of 200 kg/h, in operation with heavy vacuum gas oil (GOP), or 90 kg/h, in operation with atmospheric residue (RAT). The unit catalyst inventory is extremely high, around 300 kg. The unit has an adiabatic temperature control system for the main equipment: riser reactor, rectifier, and regenerator, which allows studies to be carried out involving the energy aspects of the process.

The cracking of triglycerides or biodiesel generates a low coke yield, leading the FCC to an energy deficit in its thermal balance. In this way, the regenerator was kept heated by preheating the air to 500° C.

Biodiesel was fed into the base of the riser reactor.

1.4—Analyses

The following yield groups were defined: fuel gas (methane, hydrogen, ethane and ethylene), LPG (C3 and C4 hydrocarbons, except propylene), propylene, naphtha (C5-220° C.), LCO (220-343° C.), decanted oil (OD: +343° C.), coke, carbon monoxide, carbon dioxide and water.

The coke yield was calculated from the combustion gas mass flow rate and its chromatographic composition. Samples of the total liquid effluent were collected to carry out the simulated distillation (ASTM D2887). For a detailed characterization of the naphtha fraction, the liquid product was further subjected to the PIANO method, which provides the distribution of hydrocarbons (n-paraffins, i-paraffins, aromatics, naphthenics, olefins) with a boiling point of up to 220° C. in mass base. The MON (Motor Octane Number) and RON (Research Octane Number) octane ratings were also calculated from the gas chromatography.

In general, studies in the literature calculate the water produced by the difference between 100% by weight and the sum of the other yields or simply do not report how the calculation of the water yield was performed. In this example, the water yield was estimated by totaling the water calculated at the end of each experiment subtracted from the value fed into the unit (lifting, dispersion, rectification and separation devices).

The catalyst-oil ratio (CTO) was calculated by the coke yield divided by the difference between carbon content in the spent and regenerated catalyst.

1.5—Experimental Result

In the state-of-the-art experiments (T1 and T2), the regeneration dense phase temperature was maintained at 690° C. by burning torch oil. Test T1 uses a reaction temperature (TRX) of 520° C., load temperature (TC) of 30° C., and conventional catalyst based on faujasite C3, while test T2 uses the same TRX of T1, but with the catalyst C4. In the experiments related to this invention (A1 to A4), the dense phase temperature was reduced to 600° C., aiming at maximizing the catalyst-oil ratio (CTO) and catalytic reactions to the detriment of thermal reactions. Catalyst C4 containing ZSM-5 was used, and the difference between regeneration temperature and reaction temperature ranged from 80° C. to 100° C.

The pressure in the riser was maintained at 257 kPa. The rectification temperature was approximately 20° C. lower than the reaction temperature in all cases.

The results in Table III show the product yields and the mass concentrations of olefins, naphthenics and aromatics of interest calculated from the PIANO method in the naphtha range.

High conversions were achieved in all cases, between 87.4% by weight and 89.0% by weight (at 520° C.), that is, a minimal difference between the highest and lowest conversion.

TABLE III

Operating conditions on the U-144, yields (% by weight in relation to the fed load), concentrations of olefins, naphthenic-olefins and/or diolefins, aromatics and octane rating in the naphtha

| Test | A1 | A2 | A3 | A4 | T1 | T2 |
|---|---|---|---|---|---|---|
| Catalyst | C4 | C4 | C4 | C4 | C3 | C4 |
| TRX (° C.) | 500 | 500 | 510 | 520 | 520 | 540 |
| TFD (° C.) | 600 | 600 | 600 | 600 | 690 | 690 |
| TC (° C.) | 100 | 150 | 100 | 100 | 30 | 200 |
| Load flow rate (kg/h) | 130 | 130 | 130 | 130 | 200 | 180 |
| Yields (wt. %) | | | | | | |
| Fuel gas | 4.0 | 4.3 | 4.8 | 6.0 | 2.9 | 5.3 |
| LPG (ex-C3=) | 14.3 | 14.4 | 16.1 | 14.9 | 8.4 | 13.1 |
| Propylene | 11.9 | 12.4 | 13.6 | 15.1 | 1.1 | 15.0 |
| Naphtha, C5-220° C. | 43.8 | 42.3 | 40.1 | 37.1 | 42.5 | 39.3 |
| benzene | — | — | — | 1.7 | 0.7 | 1.6 |
| toluene | — | — | — | 7.9 | 2.7 | 6.8 |
| o-xylene | — | — | — | 0.5 | 0.3 | 0.4 |
| m-xylene | — | — | — | 0.4 | 1.0 | 0.4 |
| p-xylene | — | — | — | 8.1 | 0.4 | 6.9 |
| ethylbenzene | — | — | — | 2.2 | 0.7 | 1.8 |
| Aromatics C6-C8 | — | — | — | 20.8 | 5.8 | 17.9 |
| LCO, 220° C.-344° C. | 9.1 | 9.3 | 8.7 | 8.4 | 25.4 | 8.5 |
| OD, +344° C. | 3.1 | 3.3 | 2.8 | 2.6 | 3.5 | 2.7 |
| Water | 8.5 | 8.5 | 8.1 | 8.4 | 10.6 | 9.5 |
| Coke | 1.2 | 1.4 | 1.3 | 1.3 | 3.0 | 1.5 |
| CO and $CO_2$ | 4.1 | 4.1 | 4.6 | 5.9 | 2.6 | 5.2 |
| Total | 100.0 | 100.0 | 100.0 | 100.0 | 100.0 | 100.0 |
| Naphtha concentration | | | | | | |
| Olefins | 17.0 | 16.5 | 14.2 | 12.8 | 42.5 | 19.6 |
| Naphthenics/Diolefins | 6.7 | 6.4 | 5.8 | 5.4 | 9.7 | 9.4 |
| Aromatics | 67.3 | 67.8 | 71.7 | 73.7 | 13.8 | 62.4 |
| MON | 96.6 | 96.8 | 98.1 | 98.6 | 77.2 | 94.0 |
| RON | 101.8 | 102.1 | 103.5 | 104.3 | 92.4 | 100.0 |
| CTO | 17.5 | 16.7 | 21.0 | 29.3 | 6.9 | 12.1 |

The concentration of naphthenic-olefins and/or diolefins provides a good indication of the stability of naphtha (directly proportional to potential gum): the lower the concentration, the greater the stability of gasoline. These concentrations are much lower in tests A1 to A4 with reduced regeneration temperature (TFD) compared to T2, that is, confirming the positive effect of the reduction in TFD, and the consequent increase in catalyst circulation (catalyst-oil ratio), on the stability of naphtha. The highest concentration of aromatics and naphtha stability was achieved at a reaction temperature of 520° C. (test A4).

In addition to stability, the benefit of the invention in relation to octane rating is clear. The octane ratings, MON and RON, are much higher in tests A1 to A4 with regeneration temperature (TFD), reduced in relation to T2, that is, confirming the positive effect of the reduction of TFD, and the consequent increase in catalyst circulation (catalyst-oil ratio), on naphtha octane rating. The highest octane rating was reached at the reaction temperature of 520° C. (test A4).

Table III also shows the percentage yields of o-xylene, m-xylene, p-xylene and ethylbenzene in relation to the load, including the state of the art T1. The total yield of aromatics with 6 to 8 carbon atoms achieved using catalysts C4 (with ZSM-5 in the test T2) was much higher than that obtained with the conventional catalyst C3 in the test T1 (17.9% by weight vs. 5.8% by weight). However, the increase in catalyst circulation obtained by applying the invention raises the aromatics again, reaching a total of 20.8% by weight in the test A4, with p-xylene being the aromatic that underwent the greatest increase, followed by toluene and of ethylbenzene. The other aromatics remained practically unchanged or suffered some decrease in their yields.

Among the C8 aromatics, p-xylene was the main compound formed when the ZSM-5 zeolite predominated in the catalytic system, while m-xylene was the predominant species with Y zeolite (C3), probably due to the smaller pore size of ZSM-5.

Example 2: FCC CC3 Pilot Plant with Biodiesel 2.1—Load

The same biodiesel from EXAMPLE 1 was used as the load, whose properties are shown in Table I.

2.2—Catalyst

The catalyst C5 was used, based on ZSM-5, containing only the ZSM-5 zeolite, and therefore without the Y zeolite (faujasite) that predominates commercially in catalytic cracking units. The fresh catalyst underwent prior deactivation at 800° C. for 5 hours, 100% vapor (2 g·min$^{-1}$). The characterization of the used catalyst is shown in Table IV.

TABLE IV

Characterization of the catalyst C5 based on ZSM-5.

|  | C5 |
|---|---|
| Surface area (m$^2$/g) | 149.6 |
| Mesopores area (m$^2$/g) | 54.0 |
| Micropore volume (cm$^3$/g) | 0.042 |

2.3—Test Units

The CC3 pilot unit is an FCC circulating unit that normally operates with load flow rates between 200 g/h and 1 kg/h. The unit catalyst inventory is around 2 kg. The unit has an adiabatic temperature control system in the riser, which allows studies involving the energy aspects of the process to be carried out.

The cracking of biodiesel decreases the coke yield, which would lead the FCC unit to an energy deficit in an industrial converter. However, in CC3, the regenerator is heated to the desired temperature only by using resistors.

2.4—Analyses

The following yield groups were defined: fuel gas (methane, hydrogen, ethane and ethylene), LPG (C3 and C4 hydrocarbons, except propylene), propylene, naphtha (C5-220° C.), LCO (220-343° C.), decanted oil (OD: +343° C.), coke, carbon monoxide, carbon dioxide and water.

The coke yield was calculated from the combustion gas mass flow rate and its chromatographic composition. Samples of the total liquid effluent were collected to carry out the simulated distillation (ASTM D2887). For a detailed characterization of the naphtha fraction, the liquid product was further subjected to the PIANO method, which provides the distribution of hydrocarbons (n-paraffins, i-paraffins, aromatics, naphthenics, olefins) with a boiling point of up to 220° C. in mass base. The MON and RON octane ratings were further calculated from the gas chromatography.

In general, studies in the literature calculate the water produced by the difference between 100% by weight and the sum of the other yields or simply do not report how the calculation of the water yield was performed. In this study, the water yield was estimated by totaling the water calculated at the end of each experiment subtracted from the value fed into the unit.

The catalyst-oil ratio (CTO) was calculated by the heat exchanger system with air existing in CC3 located in the catalyst transfer line.

2.5—Experimental Result

Table V presents the results obtained with biodiesel. Some yields can also be seen in FIGS. 5 to 11. The regeneration and reaction temperatures were gradually reduced, always keeping the delta of these temperatures at 80° C.

The pressure in the riser was maintained at 273 kPa.

Figure 4:
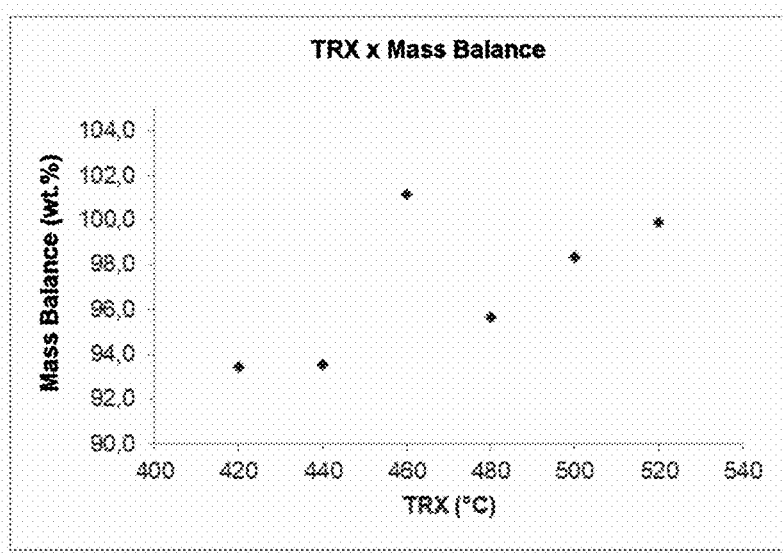
FIG. 4 illustrating a graph of the closure of the mass balance as a function of the reaction temperature.
Figure 7:
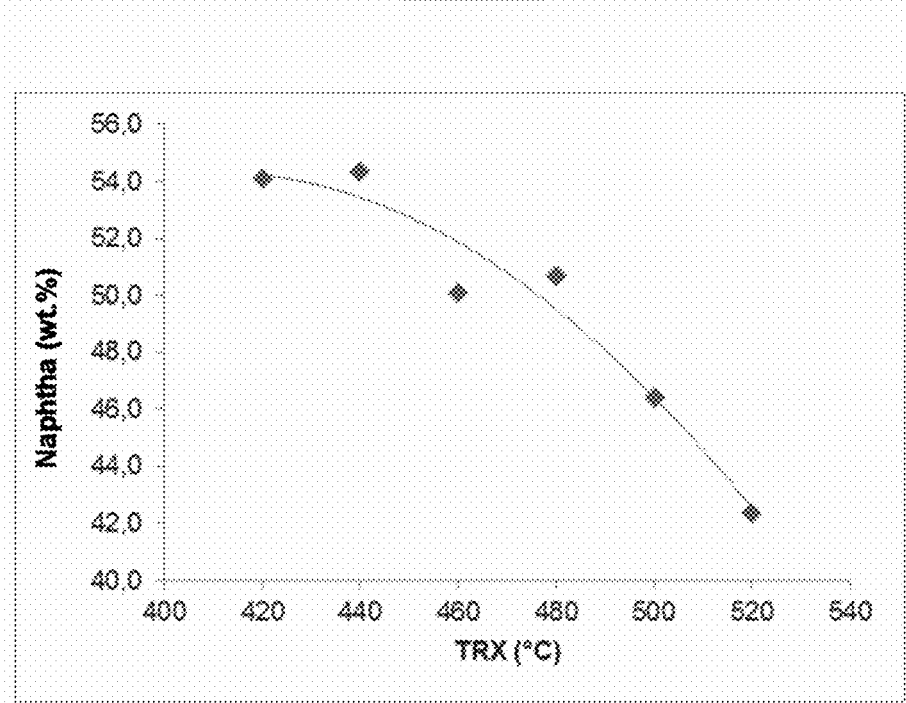
FIG. 7 illustrating Naphtha as a function of reaction temperature (TRX)

The mass balances of the unit ended between 93.4% by weight and 101.2% by weight as shown in FIG. 4.

The results in Table V show the product yields and the mass concentrations of olefins, naphthenics and aromatics of interest calculated from the PIANO method. High conversions were achieved in all cases, between 87.8% by weight and 93.9% by weight (at 500° C.), i.e., a minimal difference between the highest and lowest conversion. The concentrations of aromatics were even higher, in tests B1 to B4, than those obtained by the results of the state of the art in tests T1 and T2.

The concentration of naphthenic-olefins and/or diolefins provides a good indication of the stability of naphtha: the lower the concentration, the greater the stability of gasoline. Naphthenic-olefins reach a minimum value at a reaction temperature of 500° C., increasing at lower temperatures. The octane rating follows the aromatics content, reaching its highest value also at 500° C., 88.9 and 103.4 for MON and RON, respectively, in the test B2. Thus, the highest concentration of aromatics, highest octane rating and highest naphtha stability were achieved at a reaction temperature of 500° C. and a regeneration temperature of 580° C.

Another relevant point is the selectivity obtained among the produced aromatics. The percentage yields of o-xylene, m-xylene, p-xylene and ethylbenzene in relation to the load are much higher than those achieved by the state of the art T1, obtaining a further increase in the yield of aromatics (25.5 wt. % in the test B2 against 17.8 wt. % in the test T2, the best result in the state of the art), with p-xylene having the highest increase in absolute value.

Among the C8 aromatics, p-xylene was the main compound formed when the ZSM-5 zeolite predominated in the catalytic system, while m-xylene was the predominant species with Y zeolite (test T2), probably due to the smaller pore size than ZSM-5.

TABLE V

Operating conditions in CC3, yields (% by weight), concentrations of olefins, naphthenic-olefins and/or diolefins, aromatics and octane rating in the naphtha produced in the reaction with biodiesel.

| Test | B1 | B2 | B3 | B4 | B5 | B6 |
|---|---|---|---|---|---|---|
| Catalyst | C5 | C5 | C5 | C5 | C5 | C5 |
| TRX (° C.) | 520 | 500 | 480 | 460 | 440 | 420 |
| TFD (° C.) | 600 | 580 | 560 | 540 | 520 | 500 |
| TC (° C.) | 100 | 100 | 100 | 100 | 100 | 100 |
| Load flow rate (g/h) | 375 | 368 | 380 | 366 | 366 | 377 |
| Yields (wt. %) | | | | | | |
| Fuel gas | 5.6 | 5.2 | 4.3 | 3.6 | 3.2 | 2.6 |
| LPG (ex-C3=) | 16.7 | 17.9 | 15.6 | 15.7 | 13.1 | 13.1 |
| Propylene | 13.7 | 13.9 | 11.3 | 10.8 | 8.6 | 8.0 |
| Naphtha, C5-220° C. | 42.4 | 46.4 | 50.7 | 50.1 | 54.4 | 54.1 |
| benzene | 2.3 | 2.6 | 2.6 | 2.4 | 1.6 | 1.2 |
| toluene | 8.1 | 9.0 | 8.1 | 8.5 | 6.0 | 4.8 |
| o-xylene | 0.7 | 0.8 | 0.8 | 0.8 | 0.9 | 1.0 |
| m-xylene | 0.3 | 0.2 | — | 0.3 | 4.9 | 3.6 |
| p-xylene | 8.3 | 9.8 | — | 9.7 | 3.1 | 2.5 |
| ethylbenzene | 2.5 | 3.0 | 3.1 | 3.0 | 2.6 | 2.1 |
| Aromatics C6-C8 | 22.2 | 25.4 | 24.5 | 24.9 | 19.1 | 15.0 |
| LCO, 220° C.-344° C. | 8.8 | 4.9 | 5.2 | 5.9 | 7.1 | 9.1 |
| OD, +344° C. | 3.3 | 1.2 | 1.4 | 1.7 | 2.2 | 3.0 |
| Water | 5.1 | 6.1 | 6.9 | 8.4 | 7.0 | 5.8 |
| Coke | 0.8 | 0.9 | 1.3 | 1.0 | 1.7 | 2.0 |
| CO | 3.0 | 3.0 | 2.9 | 2.3 | 2.2 | 1.8 |
| $CO_2$ | 0.6 | 0.4 | 0.5 | 0.4 | 0.6 | 0.5 |
| Total | 100.0 | 100.0 | 100.0 | 100.0 | 100.0 | 100.0 |
| Naphtha concentration | | | | | | |
| Olefins | 15.8 | 14.7 | 16.2 | 16.1 | 23.0 | 29.6 |
| Naphthenics/Diolefins | 8.6 | 7.5 | 8.9 | 8.3 | 11.8 | 13.3 |
| Aromatics | 72.0 | 74.7 | 71.4 | 72.0 | 60.6 | 51.7 |
| MON | 87.6 | 88.9 | 87.7 | 88.1 | 84.6 | 82.7 |
| RON | 102.5 | 103.4 | 102.3 | 102.7 | 99.7 | 97.9 |
| CTO | 19.4 | 26.2 | 24.8 | 22.6 | 22.6 | 20.2 |

FIGS. 5 to 10 show the yields as a function of the reaction temperature obtained in CC3. The optimum reaction temperature for maximizing yields is between 460° C. and 500° C. Lower reaction temperatures led to considerable increases in the yields of LCO, decanted oil and coke, evidencing difficulties in vaporizing the load.

This series of experiments also allowed evaluating the efficiency of coke combustion under extreme conditions with very low dense phase temperatures. FIG. 11 shows the $CO_2/CO$ ratio and carbon in the regenerated catalyst (RCC) as a function of regeneration temperature (TFD). In conditions closer to conventional ones, CC3 operates in total combustion; however, a clear tendency to partial combustion can be observed as the dense phase temperature is reduced. As for the RCC, the regeneration of the catalyst remains adequate even at lower temperatures, but it becomes quite high at 500° C., showing in this case some deficiency in combustion.

In experiments A1 to A4, T1 and T2 for the production of bio-aromatics carried out on a demonstration scale, the burning of torch oil was necessary to maintain the regeneration temperature at 600° C. However, experiments B1 to B6 demonstrated that it is possible to decrease the regeneration and reaction temperatures simultaneously without compromising the coke combustion on the catalyst, taking the dense phase temperature up to 500° C. In this way, only the regenerator air pre-heater would be required up to a temperature of 500° C. to maintain the thermal balance. The combustion of the coke formed on the catalyst would be responsible for obtaining some more temperature than the 500° C. offered by the air heater. For a coke yield of 0.8% by weight, it is calculated that we would have approximately 80° C. more at the dense phase temperature. In this way, the dense phase temperature of the regenerator would balance between 550° C. and 580° C., eliminating the burning of torch oil in the regenerator and therefore improving the economy of the process.

Thus, concentrations and yields of aromatics much higher than those obtained using the state of the art were achieved: the total aromatics with 6 to 8 carbons is 25.5% by weight and p-xylene reached 9.8% by weight in the invention, while for the state of the art these values reach only 13.5% in weight and 2.3% in weight, respectively, and even so they are not able to solve the problem of energy deficit without using torch oil burning.

Example 3: Pilot Plant of FCC CC3 with Beef Tallow 3.1—Load

Beef tallow was used as the load and its properties are shown in Table VI.

TABLE VI

Beef tallow characterization

| Analysis | Method | Result |
|---|---|---|
| Flash point (° C.) | ASTM D92/90 | 250 |
| pH | — | 4.0 |
| Density 20/4° C. | ASTM D4052 | 0.9106 |
| Simulated Distillation | ASTM D2887 | |
| IEP, ° C. | ASTM D2887 | 353.8 |
| 5 wt. %, ° C. | ASTM D2887 | 537.6 |
| 10 wt. %, ° C. | ASTM D2887 | 574.8 |
| 20 wt. %, ° C. | ASTM D2887 | 586.6 |
| 30 wt. %, ° C. | ASTM D2887 | 591.6 |
| 50 wt. %, ° C. | ASTM D2887 | 599.0 |
| 70 wt. %, ° C. | ASTM D2887 | 603.0 |
| 80 wt. %, ° C. | ASTM D2887 | 606.2 |
| 90 wt. %, ° C. | ASTM D2887 | 608.4 |
| 95 wt. %, ° C. | ASTM D2887 | 609.4 |
| PEF, ° C. | ASTM D2887 | 612.4 |
| Oxygenates, m. % | — | 10.9 |

3.2—Catalyst

Catalyst C5, based on ZSM-5, from EXAMPLE 2 was used.

3.3—Test Units

The CC3 pilot unit was used, the same as in EXAMPLE 2.

3.4—Analyses

The same analyses and procedures as in EXAMPLE 2 were used.

3.5—Experimental Result

The results of Table VII show the yields of products obtained by the invention from beef tallow. The mass concentrations of olefins, naphthenics and aromatics in the naphtha produced were calculated using the PIANO method. High conversions, above 95% by weight, were achieved in both tests, D1 and D2. The production of aromatics with 6 to 8 carbon atoms in the D1 test was higher than those obtained by any of the tests of the state of the art, reaching 28.2 wt. %.

Example 4: FCC CC3 Pilot Plant with Naphtha

4.1—Load

Naphtha of fossil origin was used as the load, whose properties are shown in Table VIII. Naphtha has a very low octane rating, MON and RON, only 46.5 and 53.8, respectively, making it unsuitable for consumption in Otto cycle engines.

4.2—Catalyst

Catalyst C5, based on ZSM-5, from EXAMPLE 2 was used.

4.3—Test Units

The CC3 pilot unit was used, the same as in EXAMPLE 2.

4.4—Analyses

The same analyses and procedures as in EXAMPLE 2 were used.

TABLE VII

Operational conditions in CC3, yields (% by weight), concentrations of olefins, aromatics and octane rating in the naphtha produced in the reaction with beef tallow.

|  | D1 | D2 |
|---|---|---|
| Catalyst | C5 | C5 |
| TRX (° C.) | 520 | 440 |
| TFD (° C.) | 600 | 560 |
| TC (° C.) | 100 | 100 |
| Load flow rate (g/h) | 362 | 369 |
| Yields (wt. %) | | |
| Fuel gas | 8.0 | 3.2 |
| LPG (ex-C3=) | 22.6 | 20.6 |
| Propylene | 14.2 | 10.9 |
| Naphtha, C5-220° C. | 40.4 | 51.1 |
| benzene | 3.3 | 2.6 |
| toluene | 11.8 | 7.9 |
| o-xylene | 1.0 | 0.8 |
| m-xylene | 0.2 | 0.2 |
| p-xylene | 9.3 | 8.4 |
| ethylbenzene | 2.6 | 2.8 |
| aromatics C6-C8 | 28.2 | 22.7 |
| LCO, 220° C.-344° C. | 2.6 | 3.6 |
| OD, +344° C. | 0.7 | 1.2 |
| Water | 3.2 | 4.3 |
| Coke | 1.3 | 1.5 |
| CO | 5.6 | 3.1 |
| $CO_2$ | 1.5 | 0.6 |
| Total | 100.0 | 100.0 |
| Naphtha concentration (wt. %) | | |
| Olefins | 8.5 | 20.1 |
| Aromatics | 83.7 | 66.8 |
| MON | 91.7 | 85.7 |
| RON | 105.8 | 100.9 |

TABLE VIII

Naphtha characterization

| Analysis | Method | Result |
|---|---|---|
| Density 20/4° C. | Calculated | 0.7250 |
| Simulated Distillation | ASTM D2887 | |
| IEP, ° C. | ASTM D2887 | 75.4 |
| 5 wt. %, ° C. | ASTM D2887 | 88.6 |
| 10 wt. %, ° C. | ASTM D2887 | 91.8 |
| 30 wt. %, ° C. | ASTM D2887 | 102.8 |
| 50 wt. %, ° C. | ASTM D2887 | 119.4 |
| 70 wt. %, ° C. | ASTM D2887 | 128.4 |
| 80 wt. %, ° C. | ASTM D2887 | 132.8 |
| 90 wt. %, ° C. | ASTM D2887 | 139.2 |
| 95 wt. %, ° C. | ASTM D2887 | 143.8 |
| PEF, ° C. | ASTM D2887 | 168.8 |
| Paraffins C6-C7 | Gas Chromatography | 15.1 |
| Paraffins C8 | Gas Chromatography | 24.0 |
| Paraffins C9-C10 | Gas Chromatography | 5.2 |
| Olefins/Naphthenics C6-C7 | Gas Chromatography | 18.8 |
| Olefins/Naphthenics C8 | Gas Chromatography | 19.7 |
| Olefins/Naphthenics C9-C11 | Gas Chromatography | 4.1 |
| Aromatics C6-C7 | Gas Chromatography | 0.10 |
| Aromatics C8 | Gas Chromatography | 9.29 |
| Aromatics C9-C10 | Gas Chromatography | 0.43 |
| MON | Gas Chromatography | 46.5 |
| RON | Gas Chromatography | 53.8 |

4.5—Experimental Result

The results of Table IX show the yields of products obtained by the invention from naphtha. The mass concentrations of olefins, naphthenics and aromatics in the produced naphtha were calculated using the PIANO method. The production of aromatics with 6 to 8 carbon atoms in the test E1 reached 16.6 wt. %. Although lower than that achieved with renewable streams, this value is much higher than the percentage of 9.4 wt. % relative to the naphtha fed into the process. Furthermore, the octane rating of the produced naphtha is much higher than that of the naphtha fed into the process, approaching the values required by the gasoline specification.

TABLE IX

Operational conditions in CC3 using fossil naphtha in the feed, yields (% by weight), concentrations of olefins, aromatics and octane rating in the naphtha produced in the reaction.

|  | E1 |
|---|---|
| Catalyst | C5 |
| TRX (° C.) | 500 |
| TFD (° C.) | 580 |
| Load flow rate (g/h) | 365 |
| Yields (wt. %) | |
| Fuel gas | 4.2 |
| LPG (ex-C3=) | 20.9 |

TABLE IX-continued

Operational conditions in CC3 using fossil naphtha in the feed, yields (% by weight), concentrations of olefins, aromatics and octane rating in the naphtha produced in the reaction.

| | E1 |
|---|---|
| Propylene | 5.4 |
| Naphtha, C5-220° C. | 68.0 |
| benzene | 2.3 |
| toluene | 4.7 |
| aromatics C8 | 9.7 |
| aromatics C6-C8 | 16.7 |
| LCO, 220° C.-344° C. | 0.7 |
| OD, +344° C. | 0.0 |
| Water | 0.0 |
| Coke | 0.5 |
| CO | 0.34 |
| $CO_2$ | 0.05 |
| Total | 100.0 |
| MON | 74.1 |
| RON | 82.5 |
| CTO | 15.6 |

The present invention paves the way for the use of raw materials of low added value such as fatty acids and animal tallow for the production of aromatic petrochemicals from renewable origin in a profitable manner.

In addition to superior yields, the technology enables the use of catalytic systems that are more sensitive to hydrothermal deactivation, but more efficient for the production of light and aromatic olefins, as it avoids high catalyst regeneration temperatures.

It should be noted that, although the present invention has been described in relation to the attached drawings, it may undergo modifications and adaptations by technicians skilled on the subject, depending on the specific situation, but provided that within the inventive scope defined herein.

The invention claimed is:

1. A process for obtaining aromatics from streams with linear chains with 5 to 18 carbon atoms, the process comprising:
 introducing a preheated feed stream into a fluid catalytic cracking reactor so that the preheated feed stream comes into contact with intermediate pore zeolite catalyst particles from a regenerator, to obtain a mixture between gaseous cracking products and coke-deactivated catalyst, wherein the cracking products comprise hydrocarbons comprising aromatics, wherein a catalyst-preheated feed stream ratio is in a range of 5 to 30;
 separating, from the mixture, the cracking products and the coke-deactivated catalyst;
 subjecting the coke-deactivated catalyst to a rectification step with water vapor for removing light hydrocarbons to produce a rectified catalyst;
 subjecting the rectified catalyst to a regeneration step and combusting the coke deposited on the catalyst particles, in which a combustion temperature does not exceed 600° C., to obtain catalyst particles with activity higher than that of the rectified catalyst to produce a regenerated catalyst;
 allocating the regenerated catalyst with restored activity back to the fluid catalytic cracking reactor to continue the catalytic cracking process; and
 allocating the hydrocarbons to a fractionation section to separate the produced hydrocarbons according to their boiling points, wherein the combustion temperature is at least 40° C. and at most 100° C. higher than a reaction temperature in the fluid catalytic cracking reactor.

2. The process according to claim 1, wherein the preheated feed stream comprises triglycerides with carbonic chain fatty acids (C9-C18) from plant and/or animal biomass.

3. The process according to claim 1, wherein the preheated feed stream comprises free carbonic chain fatty acids (C9-C18).

4. The process according to claim 1, wherein the preheated feed stream comprises triglycerides with concentrations greater than 65% by mass of fatty acids.

5. The process according to claim 2, wherein the triglyceride is selected from soybean oil, castor oil, cottonseed oil, palm oil, pine oil, sunflower oil, jatropha oil, algae oil, or beef tallow.

6. The process according to claim 1, wherein the preheated feed stream comprises a single oil or a mixture of two or more oils.

7. The process according to claim 1, wherein the preheated feed stream comprises fossil hydrocarbons selected from oil refining streams that have boiling points in a range between 40° C. and 300° C.

8. The process according to claim 1, wherein the intermediate pore zeolitic catalyst is selected from types of structure consisting of: MFI, MEL, ZSM-8, ZSM-12, ZSM-21, ZSM-23, ZSM-35, ZSM-38, IMF, TUN, and any combination thereof.

9. The process according to claim 1, wherein the fluid catalytic cracking reactor operates at pressures in a range of 200 to 400 kPa and a contact time in a range between 1.0 and 3.0 seconds.

10. The process according to claim 1, wherein the hydrocarbon streams obtained in the fluid catalytic cracking reactor comprise fuel gas, liquefied gas, or naphtha.

11. The process according to claim 1, wherein the fluid catalytic cracking reactor is a riser type reactor.

12. The process according to claim 1, wherein air used in the combustion of the coke deposited on the catalyst is preheated through a furnace to complement a thermal balance, performing the regeneration step at temperatures from 400° C. to 550° C.

13. An aromatic stream as obtained in the process defined in claim 1, wherein the aromatic stream comprises a naphtha distillation range between 30° C. and 220° C.

14. The aromatic stream according to claim 13, wherein the aromatic stream is 100% renewable in origin.

15. The aromatic stream according to claim 14, wherein the aromatic stream comprises between 70% m/m and 90% m/m of aromatics with a benzene ring in mixture with paraffinic and olefinic compounds.

16. The aromatic stream according to claim 14, wherein the aromatic stream comprises at least 100 RON octane rating and 85 MON octane rating.

17. The process according to claim 2, wherein the triglyceride is selected from *Glycine max*, *Ricinus communis*, *Gossypium hirsutum*, *G. barbadenseis*, *Elaies guinensis*, Tall oil, *Helianthus annuus*, *Jatropha curcas*, or Tallow.

* * * * *